United States Patent
Bliesner

(12) 
(10) Patent No.: US 6,248,300 B1
(45) Date of Patent: Jun. 19, 2001

(54) DIESEL PARTICLE OXIDIZER

(76) Inventor: Wayne T Bliesner, 2251 138th Ave. SE., Snohomish, WA (US) 98296

( * ) Notice: Subject to any disclaimer, the term of this patent is extended or adjusted under 35 U.S.C. 154(b) by 0 days.

(21) Appl. No.: 09/464,095

(22) Filed: Dec. 16, 1999

Related U.S. Application Data

(60) Provisional application No. 60/112,670, filed on Dec. 17, 1998.

(51) Int. Cl.$^7$ ...................................................... B01J 19/08
(52) U.S. Cl. ................... 422/186.3; 60/274; 204/157.15
(58) Field of Search ............................... 422/186.3, 274; 422/159.15

(56) References Cited

U.S. PATENT DOCUMENTS 3,174,819 * 3/1965 Clayton .............................. 422/186.3
5,842,110 * 11/1998 Tabatabaie-Raissi et al. ... 422/186.3

FOREIGN PATENT DOCUMENTS

2045456 * 10/1980 (GB).

* cited by examiner

Primary Examiner—Kishor Mayekar
(74) Attorney, Agent, or Firm—Dowrey & Associates

(57) ABSTRACT

A method and apparatus to selectively oxidize diesel particles in the exhaust from a diesel engine provides an elliptical shaped chamber installed in series in the exhaust line from a diesel engine. The elliptical shaped chamber has an internal reflective surface and two focal lines. A flash tube is located at one of the focal lines, and a transparent exhaust tube is located at the other. Exhaust from the diesel engine is directed through the transparent exhaust tube where it is exposed to an intense flash of approximately visible light from the flash tube. The elliptical shaped reflective chamber refocuses the majority of light emitted from the flash tube into the transparent exhaust tube. The diesel particles in the exhaust absorb most of the light energy, thereby heating sufficiently to rapidly oxidize.

20 Claims, 1 Drawing Sheet

DIESEL PARTICLE OXIDIZER

CROSS-REFERENCE TO RELATED APPLICATIONS, IF ANY

This application claims the benefit, under 35 U.S.C. 119(e), of U.S. provisional application Ser. No. 60/112,670, filed Dec. 17, 1998, pending.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention.

The present invention relates, generally, to an apparatus and method and for controlling exhaust emissions, and is particularly suited for controlling unburned diesel particle emissions from a diesel engine.

2. Background Information.

A great deal of effort has been spent attempting to control emissions of diesel engines. U.S. pat. No. 5,987,882 to Voss et al. contains a thorough background discussion on diesel emissions and numerous references related to the well known subject, which will not be reiterated here.

Among other unwanted emissions, unburned carbon particles are typically present in exhaust from diesel engines. The unburned particles are particularly troublesome because carcinogenic materials are attached to the carbon particles as a product of the diesel combustion process. The carbon particles with the carcinogenic materials attached, often called "diesel particles", are usually in the form of sub-micron to micron sized particles which can be inhaled, thereby depositing the carcinogenic materials into people's lungs.

In the past, these particles have been trapped by a particle trap then burned using an additional burner, such as disclosed in U.S. Pat. No. 4,881,959 to Kono et al. Such burners are relatively inefficient in heating the diesel particles to a sufficient temperature to oxidize.

Applicant's invention provides an improved diesel particle oxidizer which efficiently heats the diesel particles using visible light energy. The applicant's invention may also be applied to any carbon particles in an exhaust stream from any combustion source.

BRIEF SUMMARY OF THE INVENTION

The present invention provides a method and apparatus to selectively oxidize diesel particles in the exhaust from a diesel engine before they enter the atmosphere. In the preferred embodiment, an elliptical shaped chamber is installed in series in the exhaust line from a diesel engine. The elliptical shaped chamber has an internal reflective surface and two focal lines. A flash tube is located at one of the focal lines, and a transparent exhaust tube is located at the other. Exhaust from the diesel engine is directed through the transparent exhaust tube where it is exposed to an intense flash of approximately visible light from the flash tube. The elliptical shaped reflective chamber refocuses the majority of light emitted from the flash tube into the transparent exhaust tube. The diesel particles in the exhaust act as black bodies and absorb most of the light energy, thereby heating sufficiently to rapidly oxidize.

In an alternate embodiment, the light source is inside an internally reflective portion of an exhaust tube and the particles are heated as they pass between the light source and the exhaust tube wall.

In another alternate embodiment, a beam of light is focused longitudinally down the inside of an exhaust pipe.

The features, benefits and objects of this invention will become clear to those skilled in the art by reference to the following description, claims and drawings.

DETAILED DESCRIPTION

Figure 1:
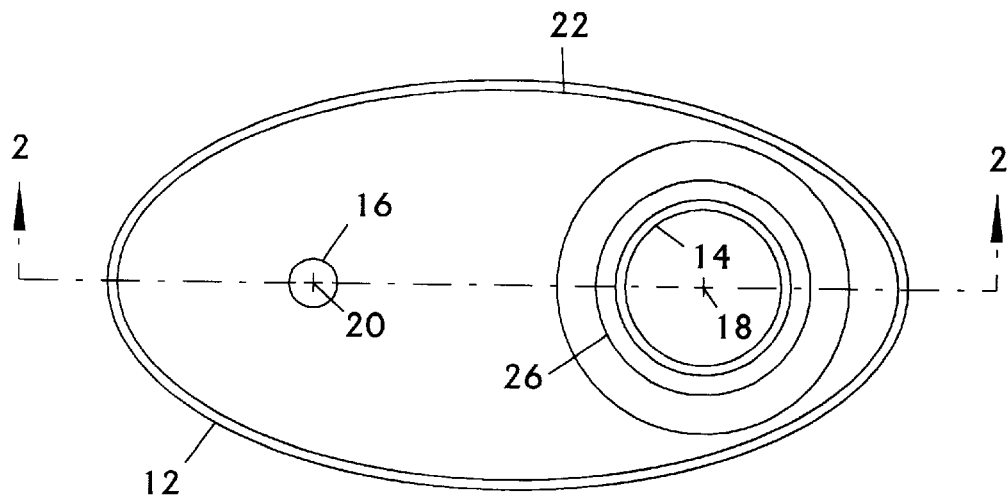
FIG. 1 is an end view of an oxidizer unit of the present invention.
Figure 2:
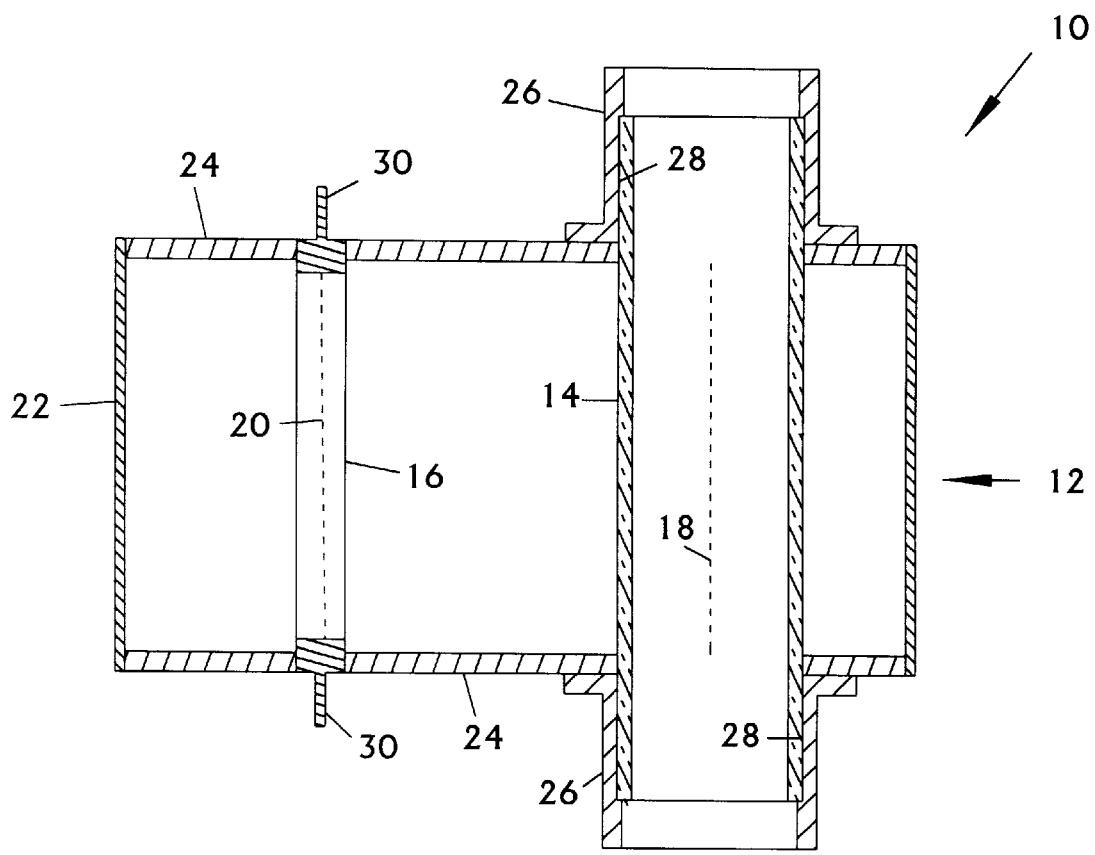
FIG. 2 is a cross sectional view taken along line 2—2 of FIG. 1.

Referring to FIGS. 1–2, an example of the preferred embodiment of the present invention is illustrated and generally indicated by the reference numeral 10. The oxidizer is described below first in terms of its major structural elements and then in terms of its secondary structural and/or functional elements which cooperate to perform the oxidizing function.

While the invention has been described in terms of oxidizing diesel particles from diesel exhaust, it should be recognized that the invention can apply to any carbon particles emitted from any exhaust from a combustion process, such as industrial furnaces and production processes.

The preferred embodiment of the diesel particle oxidizer 10 comprises an elliptical shaped reflective chamber 12 holding a transparent exhaust tube 14 and a flash lamp 16. The elliptical shaped chamber has two geometric focal lines 18 and 20 inside it. The exhaust tube 14 and flash lamp 16 are placed at those focal lines, and preferably centered about them. The diesel particle oxidizer 10 is placed in series with the exhaust pipe and muffler system connected to a diesel engine such that exhaust from the diesel engine is passed through the transparent exhaust tube where it is exposed to high intensity light from the flash lamp 16 which raises the temperature of the micron-sized diesel particles in the exhaust sufficiently to cause them to rapidly oxidize.

The elliptical shaped chamber 12 includes an elliptical reflector 22 held in shape by two ellipse end plates 24 attached on each end. The elliptical reflector 22 is made from a thin reflective pipe material, such as 430 stainless steel and surrounds the transparent exhaust tube 14 and flash lamp 16. The ellipse end plates 24 are sized so that the elliptical reflector 22 fits around the two plates and takes their shape.

The elliptical shaped chamber could be made from a number of metals or nonmetals. The reflector could also be covered with a highly reflective material, such as silver, to increase the amount of reflected light. A specialized coating could also be used which is particularly suited for reflecting a particular spectrum of light. For example, Rhodium could be used to enhance reflectivity in the infrared range.

Alternatively, the elliptical shaped chamber could be integrally incorporated in an exhaust pipe so that the exhaust pipe has a locally elliptical portion which is reflective on its inner wall, and the flash lamp could be arranged within the elliptical portion of the exhaust pipe.

An exhaust connector 26 is attached to each end plate 24 and centered about one focal line 18. The two exhaust connectors 26 locate the transparent exhaust tube 14 in the elliptical shaped chamber 12. Exhaust connectors 26 preferably have a counter-bore 28 which receives the exhaust tube 14 and holds it in proper location. The transparent exhaust tube 14 is preferably made from a material such as Pyrex glass or quartz, and allows light from the flash lamp 16 to focus within it.

The flash lamp 16 is located at the other focal line 20 and preferably extends through the two ellipse end plates 24. Two flash power leads 30 protrude through the ellipse end plates 24. The two flash power leads 30 are insulated from the ellipse end plates 24 so that electrical power travels only to the flash lamp 16. An electrical power supply (not shown) is attached to flash power leads 30.

The exhaust connectors 26 are connected in series to the exhaust system associated with the diesel engine. Exhaust flows, as indicated by the arrow F, through the lower exhaust connector 26, the transparent exhaust tube 14, and exits the upper exhaust connector 26.

The diesel particles are contained within the exhaust along with several exhaust gases which are primarily carbon dioxide, carbon monoxide, nitrogen and oxygen. As the exhaust passes through the transparent exhaust tube 14, it is exposed to a series of rapid light flashes generated by the flash lamp 16. The flash lamp 16 produces an intense, radial burst of approximately visible light which is internally reflected by the elliptical reflector 22 and directed transversely at the transparent exhaust tube 14 and refocused therein. This concentrates the majority of the light energy within the exhaust stream in the transparent exhaust tube where it is absorbed by the diesel particles to raise their temperature high enough to allow them to rapidly oxidize.

The carbon, or diesel particles act as black bodies to absorb the majority of the light energy. The refocusing of the light increases the heat-up rate of the particles. The light frequency is chosen so that it will pass through the exhaust gases without being absorbed. To effectively heat the particles, the light should have a wavelength less than the size of the particles. The diesel particles are typically 0.1–1 micron in size, and light in the infrared range is most effective. However, flash devices that emit just an infrared burst are typically relatively low power. A Xenon flash tube is the preferred light source because it produces a very high-power broad-spectrum light burst which has an infrared component which is greater than the amount of infrared produced by infrared flash devices. Xenon flash tubes also are readily available and sufficiently durable for this application. The flash lamp unit can be made from any light-emitting device, such as the Xenon flash or other type of gas flash unit. Sodium vapor or other types of ions could also be used for the light source.

The flash frequency of the flash lamp 16 is chosen based on the thermal conductivity of the exhaust surrounding the diesel particles and the speed of the exhaust within the transparent exhaust tube. Due to the small size of the diesel particles, a rapid light pulse is required to minimize thermal conduction from the diesel particles back into the exhaust stream. The diesel particles must heat rapidly, due to the light flash, and achieve sufficient temperature to rapidly oxidize within the surrounding exhaust, which contains excess oxygen. The flash frequency must also be sufficiently high so that all diesel particles passing through the transparent exhaust tube 14 are exposed to at least one flash. The minimum flash speed is timed so that before a fresh batch of diesel particles completely traverses the transparent exhaust tube 14, a flash will occur. A typical flash frequency is 100 pulses per second with the length of each pulse being approximately $\frac{1}{1000}$ of a second. Power estimates for the flash lamp are approximately 1–2 kW total for a diesel truck engine. Approximately 150 watts of power is needed if the diesel particles were to heat with 100% efficiency.

In an alternate embodiment, the flash tube is inside an exhaust tube, preferably centered along the axis so the flash tube and exhaust tube are concentric. The flash tube could also be oriented non-axially to allow a portion of light to be directed longitudinally along the exhaust tube. These configurations eliminate the elliptical shaped chamber. The internal surface of at least a portion of the exhaust tube is reflective as described above, and the flash tube is located in that portion. Exhaust flows through the exhaust tube and over the flash tube. Light from the intermittent flash produced by the flash tube is reflected several times throughout the exhaust tube and is absorbed by the particles in the exhaust as it passes between the flash tube and exhaust tube wall. The exhaust tube preferably has a round cross-section, but it may also be faceted so that light is reflected internally.

In another alternate embodiment, rather than providing a flash transverse to the exhaust flow, the flash unit could be set up as a beam which is focused longitudinally down an exhaust pipe. The flash could be of any frequency, flash duration, and intensity. A coherent light source, such as a laser, could also be used to provide the selective heating.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. An apparatus for oxidizing unoxidized carbon particles in exhaust comprising:
   an elliptically shaped chamber having a reflective internal surface and two internal focal lines;
   a transparent tube configured to conduct exhaust from an exhaust source, the tube being located in the chamber at one of the focal lines; and
   a device configured to emit intense light located in the chamber at the other focal line such that the emitted light is internally reflected by the elliptically shaped chamber and refocused into the transparent tube to heat unoxidized carbon particles in exhaust passing through the tube sufficiently to rapidly oxidize them.

2. The apparatus of claim 1, wherein the transparent tube is axially centered about the focal line at which it is located.

3. The apparatus of claim 1, wherein the device for emitting intense light is centered about the focal line at which it is located.

4. The apparatus of claim 1, wherein the transparent tube is axially centered about the focal line at which it is located and the device for emitting intense light is centered about the focal line at which it is located.

5. The apparatus of claim 1, wherein the elliptically shaped chamber includes a pair of elliptically shaped end plates in spaced parallel arrangement and a reflector disposed around the pair of end plates and attached to them such that the reflector takes the shape of the elliptically shaped to plates.

6. The apparatus of claim 5, wherein the reflector has a highly reflective internal surface.

7. The apparatus of claim 5, wherein the reflector has an internal coating of Rhodium.

8. The apparatus of claim 5, further comprising a pair of exhaust connectors, each one of the exhaust connectors attached to one of the elliptically shaped end plates outside of the elliptically shaped chamber, the exhaust connectors being in fluid communication with the transparent tube to allow exhaust to pass through one exhaust connector, the transparent tube, then through the other exhaust connector.

9. The apparatus of claim 8, wherein the exhaust connectors are aligned with and receive the transparent tube.

10. The apparatus of claim 9, wherein the exhaust connectors retain the transparent tube in the elliptically shaped chamber.

11. The apparatus of claim 1, wherein the device for emitting intense light is a xenon flash tube.

12. An apparatus for oxidizing diesel particles in exhaust from a diesel engine comprising:

an elliptically shaped chamber having a reflective internal surface and two internal focal lines;

a transparent tube configured to pass exhaust through it, the tube being located in the chamber and axially centered at one of the focal lines;

a device configured to emit intense light located in the chamber and centered at the other focal line such that the emitted light is internally reflected by the elliptically shaped chamber and refocused into the transparent tube to heat diesel particles in the exhaust passing through the tube sufficiently to rapidly oxidize them; and exhaust connectors attached to the elliptically shaped chamber, the exhaust connectors cooperating with the transparent tube and being in fluid communication with it to allow passage of the exhaust through the exhaust connectors and transparent tube.

13. An apparatus for oxidizing diesel particles in an exhaust stream from a diesel engine comprising:

an elliptically shaped chamber having a pair of elliptically shaped end plates in spaced parallel arrangement, a reflector disposed around the pair of end plates and attached to them such that the reflector takes the shape of the elliptically shaped end plates and has a reflective internal surface, and two internal focal lines;

a transparent tube configured to pass exhaust through it, the tube being located in the chamber and axially centered at one of the focal lines, the transparent tube extending beyond the end plates;

a flash tube located in chamber and axially centered at the other focal line such that light emitted from the flash tube is internally reflected by the elliptically shaped chamber and refocused into the transparent tube to heat diesel particles in the exhaust passing through the tube sufficiently to rapidly oxidize them; and a pair of exhaust connectors, each one of the exhaust connectors attached to one of the elliptically shaped end plates outside of the elliptically shaped chamber, the exhaust connectors being aligned with the transparent tube and receiving and retaining the transparent tube, the exhaust connectors being in fluid communication with the transparent tube to allow the exhaust to pass through one exhaust connector, the transparent tube, then through the other exhaust connector.

14. An apparatus for oxidizing unoxidized carbon particles in exhaust comprising:

an exhaust tube configured to conduct exhaust from an exhaust source, the exhaust tube having at least a portion with a reflective internal surface; and a device configured to emit intense light located in the exhaust tube at the reflective portion such that the emitted light is internally reflected in the exhaust tube to heat unoxidized carbon particles in exhaust passing through the exhaust tube sufficiently to rapidly oxidize them.

15. In a diesel power system which includes a diesel engine and an exhaust train through which exhaust from the diesel engine passes, the exhaust containing oxygen and unoxidized particles of combustion, a method of reducing the unoxidized particles in the exhaust comprising the steps of:

moving the exhaust through the exhaust train; and introducing intense light into the exhaust in the exhaust train such that the unoxidized particles absorb energy from the light sufficiently to raise their temperature to a level where they can rapidly oxidize.

16. The method of claim 15, further comprising the steps of:

passing the exhaust through a transparent tube in the exhaust train; and focusing the light within the transparent tube.

17. The method of claim 16, wherein the light is directed at the tube in a direction generally normal to the tube.

18. The method of claim 16, further comprising the step of pulsing the light at a frequency corresponding with speed of the exhaust passing through the tube.

19. The method of claim 16, wherein the light is emitted from a source in proximity of the transparent tube.

20. In a diesel power system which includes a diesel engine and an exhaust train through which exhaust from the diesel engine passes, the exhaust containing oxygen and unoxidized diesel particles, a method of reducing the unoxidized diesel particles in the exhaust comprising the steps of:

passing the exhaust through a transparent tube in the exhaust train;

flashing an intermittent intense light in proximity of the transparent tube;

pulsing the light at a frequency corresponding with speed of the exhaust passing through the tube; and focusing the majority of the intense light into the exhaust within the transparent tube such that the diesel particles absorb energy from the light sufficiently to raise their temperature to a level where they can rapidly oxidize.

* * * * *